July 5, 1949.   G. W. JONSON   2,475,099
INTERMITTENT FILM MOVEMENTS HAVING FILM REGISTRATION
Filed Jan. 30, 1948   2 Sheets-Sheet 1

Inventor
Gustave W. Jonson
Bakelew & Scantlebury
Attys.

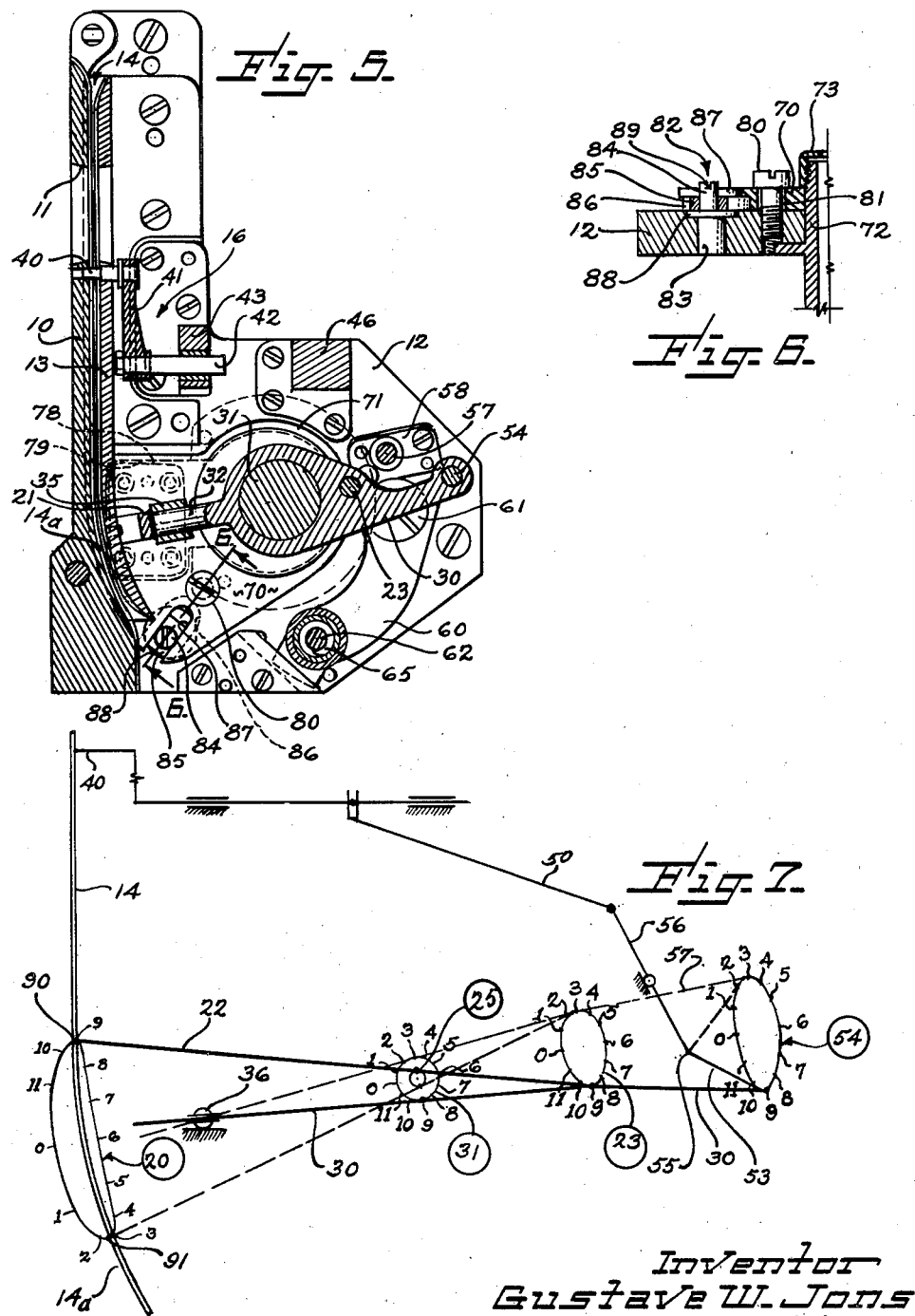

Patented July 5, 1949

2,475,099

UNITED STATES PATENT OFFICE 2,475,099

INTERMITTENT FILM MOVEMENTS HAVING FILM REGISTRATION

Gustave W. Jonson, Van Nuys, Calif., assignor to Mitchell Camera Corporation, Glendale, Calif., a corporation of Delaware Application January 30, 1948, Serial No. 5,293

3 Claims. (Cl. 88—18.4)

This invention relates generally to kinetograph movements of the type having an intermittent film moving mechanism and a cooperating film registering mechanism which locks the film in accurately registered position while it is not being moved. The points at which the film moving and the film registering mechanisms respectively engage film perforations are ordinarily separated, and that separation must be properly related to the spacing of the film perforations. Since the latter spacing varies somewhat with such factors as moisture content of the film, it is desirable to provide a compensating adjustment in the movement by which the relative positions of the two film engaging devices can be varied to suit various film conditions.

More particularly, the invention concerns an adjustment mechanism of the above type which is especially well adapted for use with a claw type of film moving mechanism in which the claw carrying arm and the actuating mechanism which controls its motion are entirely supported by a drive shaft and by a pivot mounted on a pivot axis parallel to the drive shaft, for example in the manner to be described. In such mechanisms, the parallel drive shaft axis and pivot axis together define a plane which is here referred to as the axial plane of the intermittent mechanism.

An important object of the present invention is to provide in such a movement means for accurately adjusting the spacing between the film engaging positions of the film moving and the film registering mechanisms, while maintaining the pattern of motion of each individual mechanism and the relative timing of the two mechanisms substantially constant.

Further objects of the invention are to provide an adjustment of the type described which is relatively simple and economical to construct; which can be accurately and conveniently adjusted while the machine is in operation; which can be firmly locked in its adjusted position; and which, when locked, provides a satisfactorily rigid support for the moving parts of the mechanism.

These and other objects and advantages are attained, according to the present invention, by mounting the intermittent mechanism on the frame in such a way that it is adjustably movable with respect to the frame to vary the position along the film chute at which it engages the film. With the preferred form of claw mechanism described above, such adjustability of the mechanism is preferably obtained by mounting the guide pivot so that its pivot axis is movable transversely of the above defined axial plane of the mechanism. In particularly, by limiting the pivot adjustability to motion about the drive shaft as an axis, the entire intermittent mechanism is made in effect to swing about the shaft axis, and this shifts the film engaging claw and its stroke pattern along the film chute toward or away from the film registering mechanism without disturbing the stroke pattern itself.

The exact nature of the invention, together with further objects and advantages thereof, will be more fully understood from the following illustrative description of a preferred manner of carrying it into effect in connection with a typical form of kinetograph movement. This description, which is not intended to limit the broader scope of my invention, is to be read in conjunction with the accompanying drawings, of which:

Fig. 5 is a vertical section taken as indicated by the lines 5—5 in Figs. 2 and 3, and is in the same aspect as Fig. 1;

Fig. 6 is a fragmentary section taken as indicated by the line 6—6 in Fig. 5; and Fig. 7 is a diagrammatic layout of the movement, illustrating the paths of motion of certain points in the mechanism.

Figures 1, 2, 3, 4:
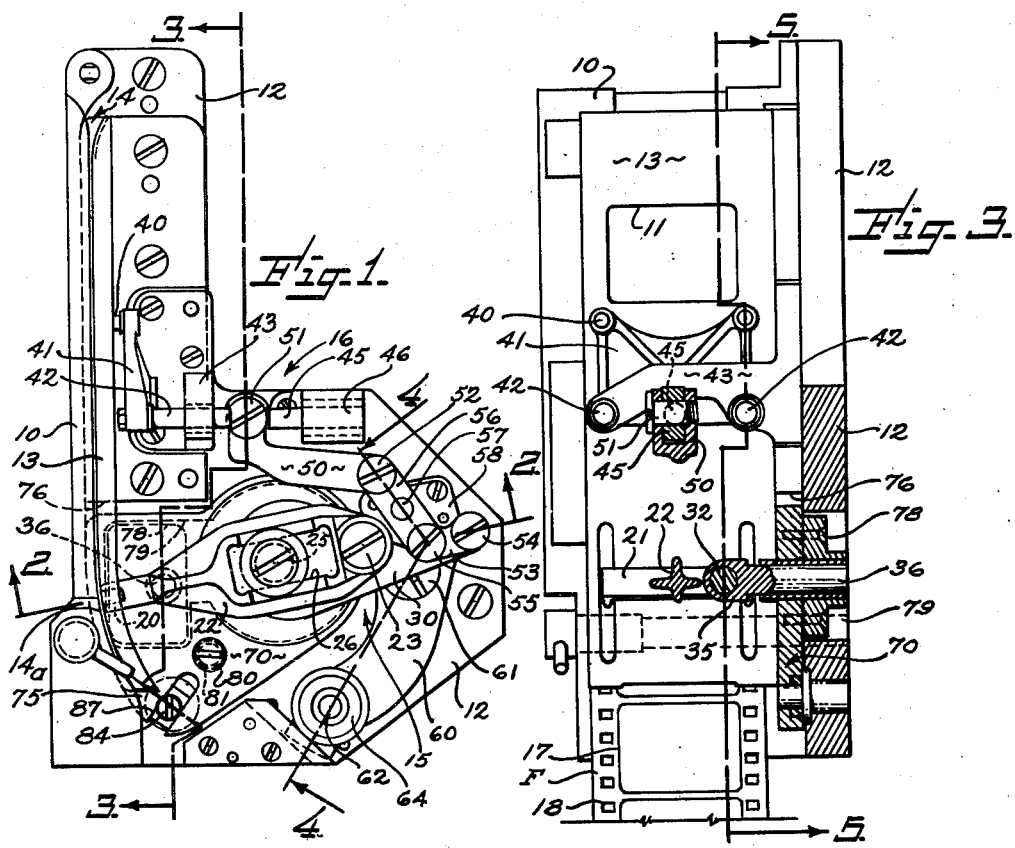
Fig. 1 is a side elevation of a kinetograph movement embodying the invention.
Fig. 2 is a section taken as indicated by the line 2—2 in Fig. 1.
Fig. 3 is a vertical section taken as indicated by the line 3—3 in Fig. 1.
Fig. 4 is a fragmentary section taken as indicated by the line 4—4 in Fig. 1.

It will be convenient to describe first the structure of the illustrated typical film movement without reference to the embodiment therein of the present invention.

In the drawings the numeral 10 designates a vertical aperture plate having an exposure aperture 11, and numeral 12 designates a vertical frame plate arranged at right angles to and extending rearwardly from an edge of plate 10, said plates 10 and 12 being adapted to be mounted in any suitable manner in the motion picture machine, not shown. Spaced rearwardly from aperture plate 10 and extending at right angles from plate 12 is a guide plate 13, between which and the aperture plate is the guideway or film chute 14 for the film F, which is shown in the lower portion of Fig. 3, but is omitted from the other drawings for the sake of clarity. The film is moved intermittently in the guideway by the film moving means, indicated generally by the numeral 15, and is engaged during the period of dwell, that is, alternately with the periods of pull down, by the film holding and registering means, indicated generally at 16, which registers successive film frames 17 with exposure aperture 11.

Intermittent movement 15 engages film perforations 18 by means of suitable claw pins 20 which are mounted on a cross arm 21 on the forward end of claw arm 22. The rearward end of claw arm 22 is pivoted at 23 to driving arm 30, and the intermediate portion of the claw arm is guided by the claw arm cam, preferably a circular eccentric, 25, which engages the sides of longitudinal guide slot 26. Circular cam 25 is eccentrically mounted at the outer end of main driving shaft 28, which is journaled in a bearing 29 in sleeve 72, rigidly mounted on a frame plate 12 and carrying nut 73.

Driving arm 30 is provided forwardly of pivot 23 with a strap portion which embraces driving arm cam (circular eccentric) 31. Cam 31 is mounted on driving shaft 28 inwardly of cam 25, and in the present embodiment is 180° out of phase with the latter cam and has relatively small eccentricity. The forward end portion of driving arm 30 is in the form of a cylindrical slide rod 32 which slides in and is guided by a pivoted guide block 35. The latter is pivoted by means of trunnion 36 in bushing 37, which is mounted on frame plate 12 by means to be described.

In operation, rotation of driving shaft 28 (clockwise as seen in Figs. 1, 5 and 7) causes driving arm 30 to oscillate about the pivot axis of trunnion 36 and to reciprocate with respect to pivoted guide block 35. Pivot 23 is thus moved through a generally elliptical path, as indicated schematically in Fig. 7. That motion is imparted by pivot 23 to the rearward end of claw arm 22, and produces, in combination with the action of claw arm cam 25, a motion of claw pins 20 along a stroke pattern such as that indicated in Fig. 7. The lower portion 14a of film chute 14 is preferably curved rearwardly as indicated in Figs. 1, 5 and 7, following roughly a circular arc about the axis of drive shaft 28, thus conforming generally to the overall shape of the stroke pattern of claw pins 20. At the upper end 90 of the claw stroke, pins 20 engage film perforations, then move downward, drawing the film through film chute 14, and are retracted from the film at the lower end 91 of the stroke. The length of each stroke is as nearly as may be equal to the interval between successive film frames, so that on the following stroke the claw pins cleanly enter another set of film perforations.

The intermittent mechanism here described is typical of movements in which motion is transmitted to a claw arm from a cam or the like on a driving shaft, and in which the claw arm and its actuating mechanism are entirely supported on the driving shaft and on a pivot. Movements of this general type are well known in which a single rather than a double cam is used, and the cam or cams may be of various types, including, for example, a cam working in a box. The pivot upon which the intermittent mechanism is partly supported may be fixed with relation to a member of that mechanism and be mounted for reciprocating motion relative to the machine frame, rather than the opposite relationship as in the present modification, in which pivot trunnion 36 has a relatively fixed pivot axis and is slidingly related to driving arm 30 of the intermittent mechanism. Furthermore, the pivot need not be located between the driving shaft and the film chute, but is frequently mounted, for example, on the opposite side of the driving shaft from the film chute. These and other modifications are well known in intermittent movements of the general type defined above, typical examples of such modifications being found, for example in Patent No. 936,031, issued on October 5, 1909, to J. J. Pink and in Patent No. 1,850,411 issued to G. A. Mitchell on March 22, 1932.

Film holding and registering means 16 of the present preferred embodiment engages the film by means of pilot pins 40 which are mounted on the offset cross arm 41. Cross arm 41 is supported and guided for reciprocating motion toward and away from film chute 14 by two rods 42, mounted in slide bearings in bracket 43, and by an intermediate rod 45, having a slide bearing in bracket 46. Brackets 43 and 46 are mounted on and project from frame plate 12 as shown in Figs. 1, 3 and 5. Reciprocating motion in timed relation to the motion of intermittent mechanism 15 is imparted to cross arm 41 through intermediate rod 45 by a linkage which comprises three principal members. These are upper link 50, bifurcated at its forward end and pivoted at 51 to rod 45 (Fig. 3); lower link 53, pivoted at its rearward end at 54 to driving arm 30 of the intermittent mechanism at a point spaced rearwardly of and somewhat below pivot 23 (Figs. 2 and 5); and lever 56, pivotally connected at its ends respectively to the rearward end of link 50 at 52 and to the forward end of link 53 at 55, and pivotally mounted near its center at 57 on bracket 58. Bracket 58 is adjustably supported on frame plate 12 as will be described, but is normally rigidly held in the position shown, for example, in Fig. 1.

The linkage 50, 56, 53 transmits the reciprocating motion of driving arm 30 of intermittent mechanism 15 to cross arm 41 and pilot pins 40 of the registering mechanism, centrally pivoted lever 56 serving to invert the phase of the motion of one mechanism relative to that of the other. Thus pilot pins 40 are moved into film engagement as claw pins 20 are withdrawn, holding the film in registered position throughout the period of film dwell. Then, as claw pins 20 move forward to re-engage the film, pilot pins 40 are withdrawn, releasing the film for the succeeding pull down stroke.

As will be seen from Fig. 7, pivot 54 at the rearward end of driving arm 30 (from which registering mechanism 17 is actuated) describes a path which includes a rearward portion which is approximately circular and a forward noncircular portion. (In Fig. 7 the paths of the several parts are indicated by the same numerals, encircled, as have been applied to the parts.) Pivot 55 is located approximately at the center of curvature of the circular portion of that path. Accordingly, while pivot 54 is describing the rearward portion of its path, that is, while claw pins 20 are withdrawn from the film, lower link 53 tends merely to swing around pivot 55 as a center, imparting substantially no motion to registering mechanism 16. This has the advantage that pilot pins 40, after engaging the film, remain substantially stationary in full film engagement during the greater part of the period of film dwell. In other words, particularly during the period of dwell, the registering mechanism is actuated primarily by the reciprocating motion of the intermittent mechanism, and is relatively independent of the oscillating motion of that mechanism.

In order to permit claw pins 20 and pilot pins 40 to be simultaneously withdrawn from film chute 14 and thus facilitate threading of the film, pivot 57, which carries linkage lever 56, is movably mounted on frame plate 12, as by means of lever 60, Fig. 1. As illustrated, lever 60 is pivoted at a point intermediate its length by screw stud 61 to frame plate 12, and carries bracket 58 for pivot 57 at its upper end. The lower portion of lever 60 carries a locking pin 62 which enters bore 63 in plate 12 to lock the lever in its normal operating position. By means of handle 64 pin 62 can be withdrawn from hole 63 against the force of spring 65 to release lever 60 for swinging motion about its pivot 61 in a clockwise direction as seen in Figs. 1 and 5. That motion moves pivot 57 rearward, swinging linkage lever 56 generally about its lower pivot 55 in a clockwise direction and withdrawing pilot pins 40 from film engagement in all positions of intermittent mechanism 15.

The above described mechanism is a typical example of film movements which may embody the present invention. Certain features of the movement itself, as thus far described, are discussed in more detail and are claimed in Patent No. 1,930,723, issued to George A. Mitchell on October 27, 1933.

A preferred illustrative manner in which the present invention can be embodied in this particular type of movement will now be described. A support member 70 in the form of a plate with a strap portion 71 is mounted with the strap portion embracing the mounting sleeve 72 of driving shaft bearing 29, and is confined between frame plate 12 and bearing retaining nut 73, carried by the sleeve. Plate 70 is thus rotatable about the axis of driving shaft 28, but is restrained against other motion by sliding contact of its outer and inner faces respectively with retaining nut 73 and frame plate 12. Plate 70 has a circular edge portion 75, which generally follows the lower curved portion 14a of film chute 14, and which fits slidingly between frame plate 12 and the edge of guide plate 13, cut away to receive it as indicated at 76.

Guide block 35 of the intermittent movement is pivotally mounted on support plate 70, rather than directly on frame plate 12. In the preferred form illustrated, journal bushing 37, in which pivot trunnion 36 of guide block 35 is pivotally mounted, is fixed in bracket 78, screwed to the inner face of support plate 70, and projects outward through an opening in that plate. A clearance opening 79 is cut in frame plate 12 to receive bracket 78, allowing adequate clearance for the relatively slight motion of the latter which is required.

Locking means are provided by which support plate 70 can be clamped against frame plate 12 and locked against swinging about the axis of drive shaft 28. As illustrated, a clamping screw 80 passes through a slotted or oversize opening 81 in plate 70 and is threaded into frame plate 12 (Fig. 6). Upon loosening of screw 80, the rotational position of support plate 70 (and hence of pivot 36) is accurately adjustable by adjustment means, illustratively shown as comprising eccentric pin 82. The latter has a trunnion 83 journaled in frame plate 12 (Fig. 6), and an eccentric portion 84 which rotatively carries a slider block 85. Block 85 fits slidingly in a groove 86, cut in plate 70 radially with respect to shaft 28. Groove 86 has flanges 87 at the outer face of plate 70, which overlap and retain block 85, thus retaining also pin 82 by contact of the inner face of block 85 with pin flange 88, which is intermediate the shaft and eccentric portions of the pin. The outer end of pin 82 carries a tool fitting, such as slot 89 adapted to receive a screw driver, by which the pin can be accurately rotated about the axis of its trunnion 83. Such rotation displaces slide block 85, due to the throw of eccentric pin portion 84, swinging plate 80 through a small and accurately controllable angle about the axis of drive shaft 28.

Such rotational adjustment carries guide block 35 through the same small angle about the drive shaft 28 of the intermittent mechanism. The entire mechanism is thus swung as a unit about its driving shaft. In particular, claw arm 22 is thus swung about the shaft axis, bringing film engaging claw pins 20 closer to or farther from pilot pins 40 of the registering mechanism, depending upon the direction of rotation of eccentric pin 82.

The magnitude of the necessary adjustment depends upon the maximum anticipated variation in film dimensions, which is roughly 1%, and upon the distance from pilot pins 40 to the lower end of the claw stroke, indicated at 91 in Fig. 7. Even if, as is normally the case, claw pins 20 fit film perforations 18 with an appreciable vertical clearance, the film is brought by each intermittent movement to a position which is precisely defined with relation to point 91. That position must be such as to bring a set of film perforations directly opposite pilot pins 40, which ordinarily fit the perforations with virtually no vertical clearance. In practice a sufficient range of adjustment is obtained if the eccentricity of pin 82 is approximately 0.020".

In the broader aspects of the present invention it may not be objectionable to move the pivot axis non-concentrically with respect to the axis of driving shaft 28, even though such motion affects somewhat the stroke pattern. Thus pivot trunnion 36 may be mounted in any manner which permits adjustable movement generally transversely of driving arm 30, or, more exactly, transversely of the common plane defined by the pivot axis and the axis of drive shaft 28. An advantage of the present preferred embodiment is that, while the orientation within the machine frame of the intermittent mechanism 15 as a whole is adjustably varied, the arrangement of the parts within the intermittent mechanism itself is not affected. In particular, those internal characteristics of the mechanism which determine the stroke pattern of claw pins 20 remain constant. The separation of the parallel axes of drive shaft 28 and guide block pivot 26 is one of those characteristics, and is seen to remain strictly constant, since only rotational motion about shaft 28 is involved in the adjustment. The result can be clearly visualized from Fig. 7, in which the effect of the adjustment is to rotate the entire stroke pattern of claw arm 22 and driving arm 30 about the common axis of eccentric cams 25 and 31 (axis of shaft 28). The path of pin claws 20 (at the left in Fig. 7) is thus moved bodily and without distortion of the path itself along the curved portion 14a of film chute 14. Since the form of chute portion 14a approximates a circular arc about shaft 28, the points 90, 91 along the path of the pin claws at which they respectively engage and disengage the film remain substantially unaltered by the adjustment. Such slight motion of points 90 and 91 along the path 20 as may result, if chute portion 14a is not strictly circular, can cause only a second order variation in the effective length of the pull-down stroke, since at points 90 and 91 the path of claws 20 is approximately normal to the film chute.

As has been pointed out, film holding and registering mechanism 17 is actuated primarily by the reciprocating motion of the intermittent mechanism and only secondarily by its oscillating motion. Since the reciprocating motion is radial with respect to shaft 28, the rotational adjustment of pivot 36 about shaft 28 produces no component of displacement parallel to that reciprocating motion. Thus the adjustment can affect the action and the relative timing of registering mechanism 16 only to the relatively slight extent that that mechanism is actuated by the oscillatory motion of the intermittent.

The present detailed embodiment is especially adapted for use in a background projection machine, in which the film aperture 11 must transmit a particularly intense light beam and is therefore subjected to unusually high temperatures. In such a machine the intermittent mechanism 15 is preferably spaced especially far below film aperture 11, leading to a wider separation between claw pins 20 and pilot pins 40 than, for example, in mechanisms designed for cameras. For this reason, and also because the condition of film to be projected cannot in practice be controlled as closely as that of raw film, the embodiment of the present invention in a machine of this type offers particularly great practical advantages. However, the invention can be used with cameras as well as with projection machines, and it is not intended that the present illustrative embodiment be interpreted as limiting the scope of the invention, which is defined by the following claims.

I claim:

1. In a film movement having a frame, a film guideway mounted on the frame, a rotatable drive shaft journaled in the frame, film moving means of the claw type adapted to engage the film intermittently at a definite longitudinal position of the guideway, said film moving means being entirely supported by the drive shaft and by a pivot mounted on a pivot axis parallel to the axis of the drive shaft, and film registering means operatively connected to said film moving means for actuation in timed relation therewith and adapted to engage the film at a fixed position longitudinally spaced along the guideway from the first said position; the improvement which comprises a support member mounted on the frame and rotationally adjustable about the axis of the drive shaft, the said supporting pivot being mounted on the support member, whereby the pivot axis of the supporting pivot is adjustable along a circular arc about the axis of the drive shaft to vary the longitudinal spacing between the film registering means and the position of film engagement of the film moving means while maintaining other operating characteristics of the film movement substantially constant.

2. In a film movement having a frame, a rotatable drive shaft journaled in the frame, a film guideway supported on the frame and having a curved section approximating a circular arc about the axis of the drive shaft, film moving means of the claw type entirely supported by the drive shaft and by a pivot mounted on an axis parallel to the axis of the drive shaft, the said film moving means incluidng a claw arm carrying a film engaging claw and means for moving the claw transversely of the film guideway into and out of film engagement and longitudinally of the guideway along a definite portion of its length which lies substantially within the said curved section, and film registering means adapted to lockingly engage the film at a fixed position longitudinally spaced along the guideway from the said portion of its length, said film registering means being operatively connected to the film moving means for actuation in timed relation therewith by virtue primarily of the said transverse motion of the claw; settable means for adjustably varying the position along the guideway of that portion of the guideway within which the claw motion takes place to vary the distance between that position and the fixed position of film engagement of the film registering means while maintaining other characteristics of the film movement substantially constant, said settable means comprising a movable support member upon which the said supporting pivot is mounted, said support member being mounted on the frame for rotational motion through at least a small angle about the axis of the drive shaft, means for adjustably moving said support member, and means for releasably locking said support member with respect to the frame.

3. In a film movement of the type which includes a frame, a rotatable drive shaft journaled on the frame, a film guideway mounted on the frame and having a portion which is curved approximately concentrically about the drive shaft, and film moving means of the claw type adapted to engage the film intermittently at a definite longitudinal portion of the guideway within the said curved portion thereof, said film moving means being entirely supported by the drive shaft and by a pivot mounted on a pivot axis parallel to the axis of the drive shaft; the improvement which comprises a support member mounted on the frame and rotationally adjustable about the axis of the drive shaft, the said pivot being mounted on the support member, whereby the pivot axis is bodily shiftable about the shaft axis to vary the position along the guideway of the point of film engagement of the film moving means, while maintaining other operating characteristics of the film movement substantially constant.

GUSTAVE W. JONSON.

REFERENCES CITED

The following references are of record in the file of this patent:

UNITED STATES PATENTS

| Number | Name | Date |
| --- | --- | --- |
| 1,227,887 | Connor et al. | May 29, 1917 |
| 1,648,559 | Mitchell | Nov. 18, 1927 |
| 1,930,723 | Mitchell | Oct. 17, 1933 |
| 2,288,928 | Worrall | July 7, 1948 |